No. 654,794. Patented July 31, 1900.
A. KELLEY.
MATCH MAKING MACHINE.
(Application filed Mar. 28, 1900.)
(No Model.) 8 Sheets—Sheet 6.
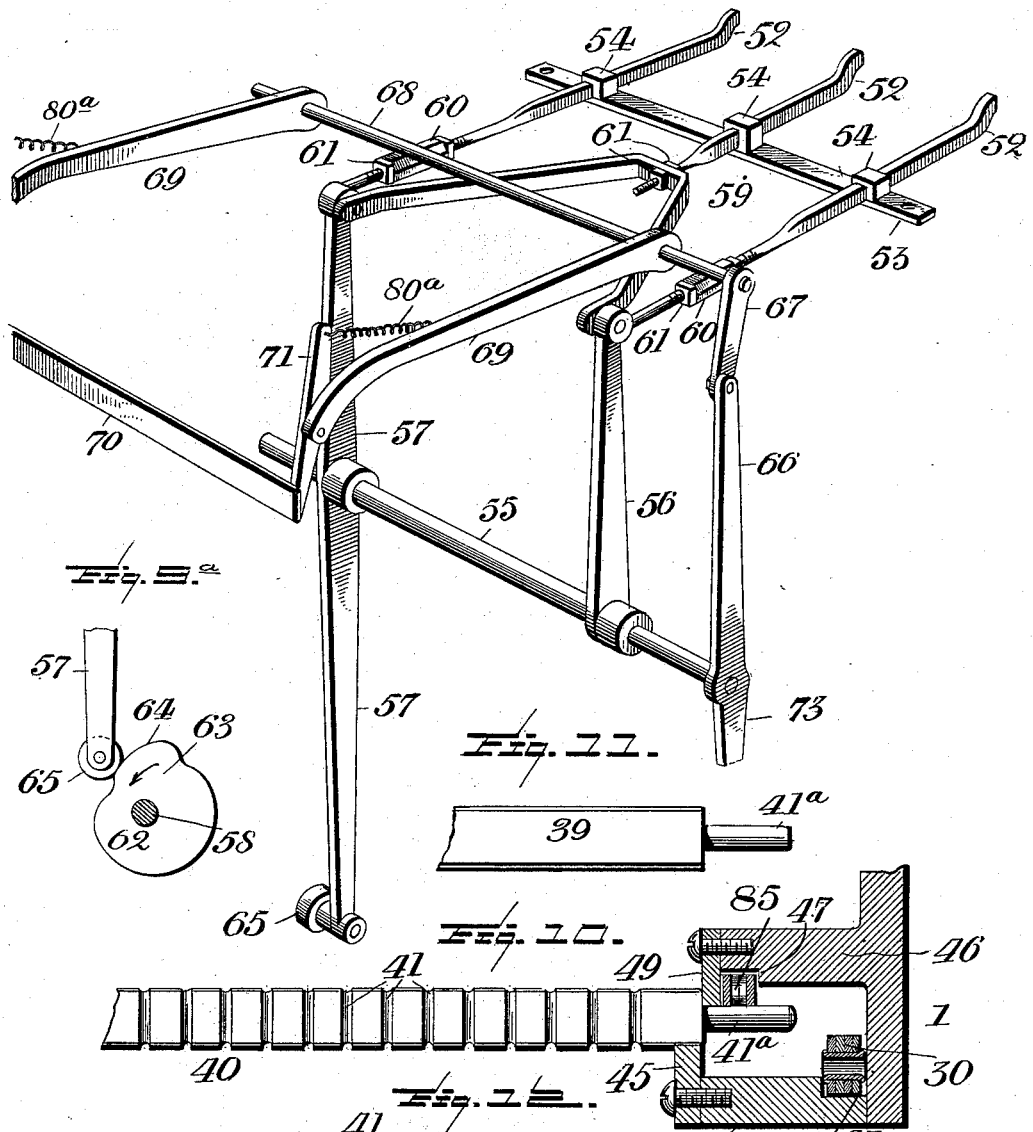

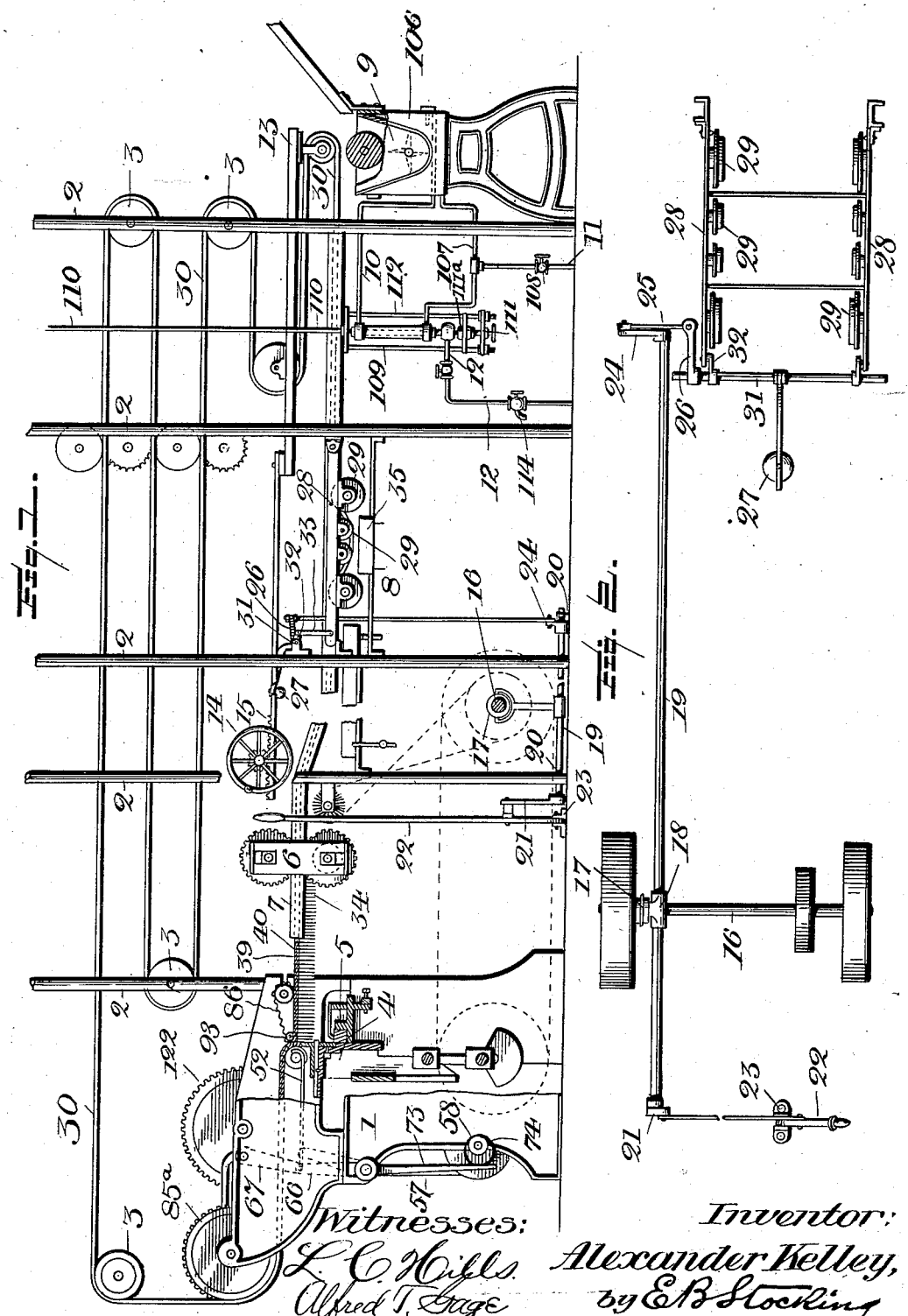

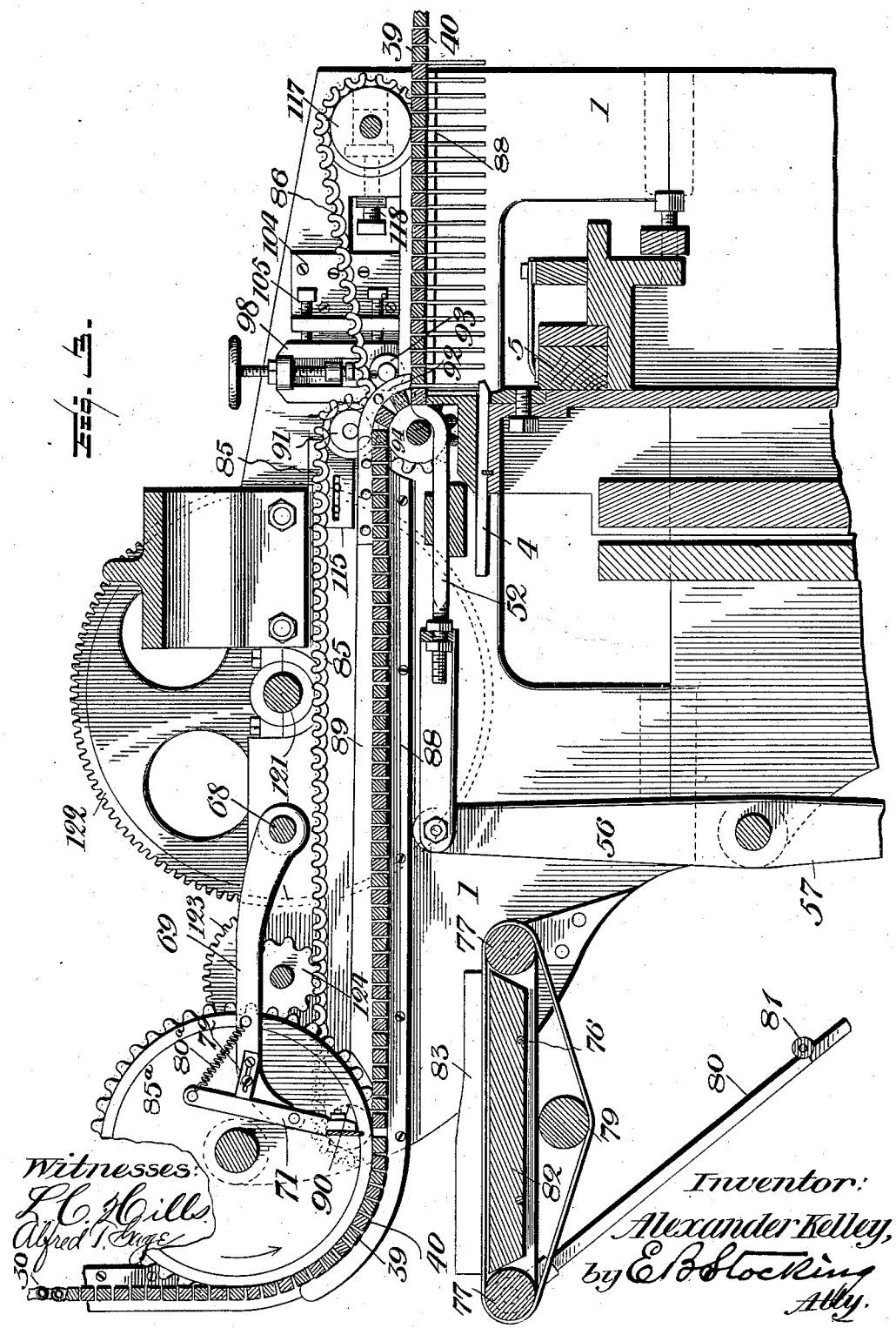

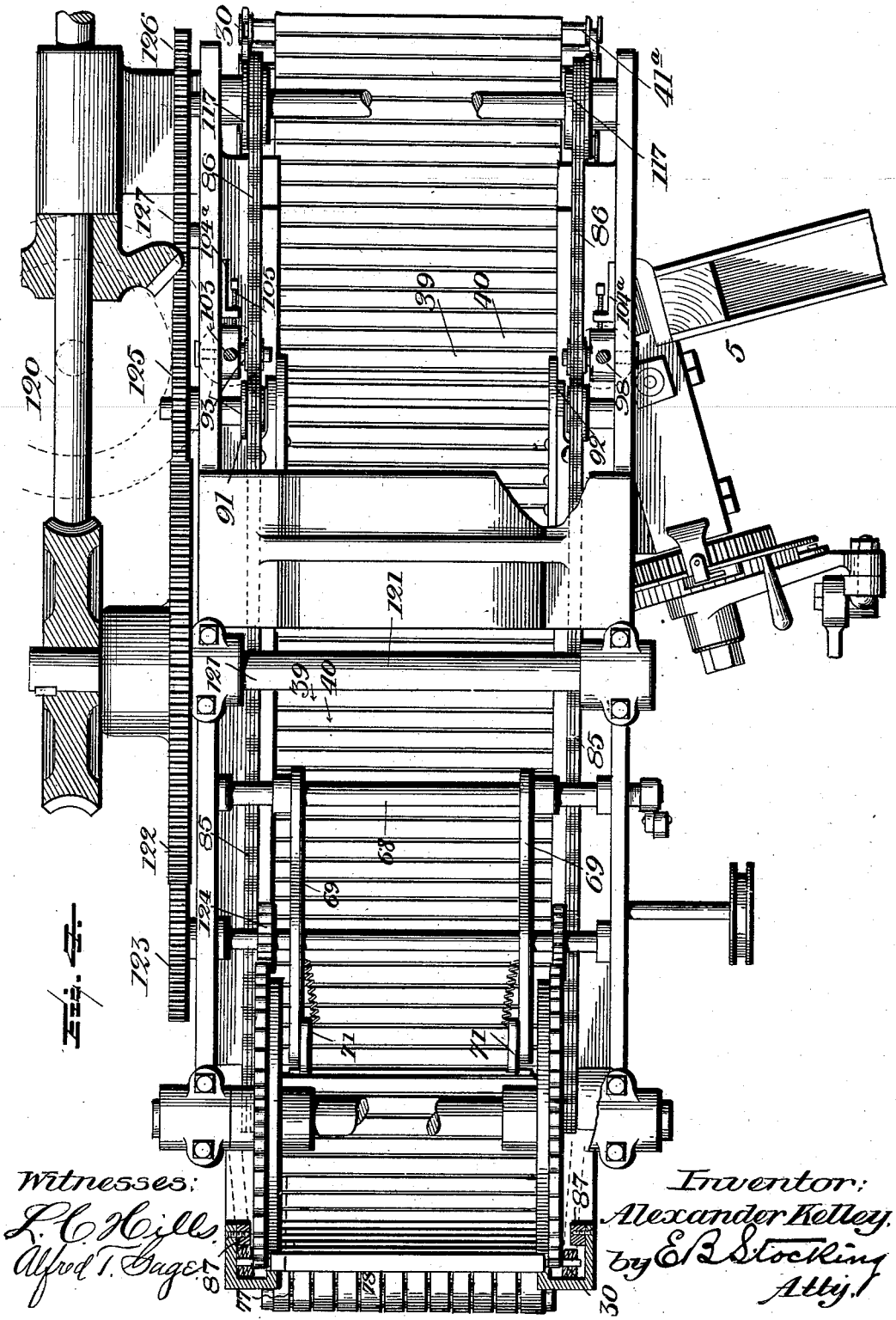

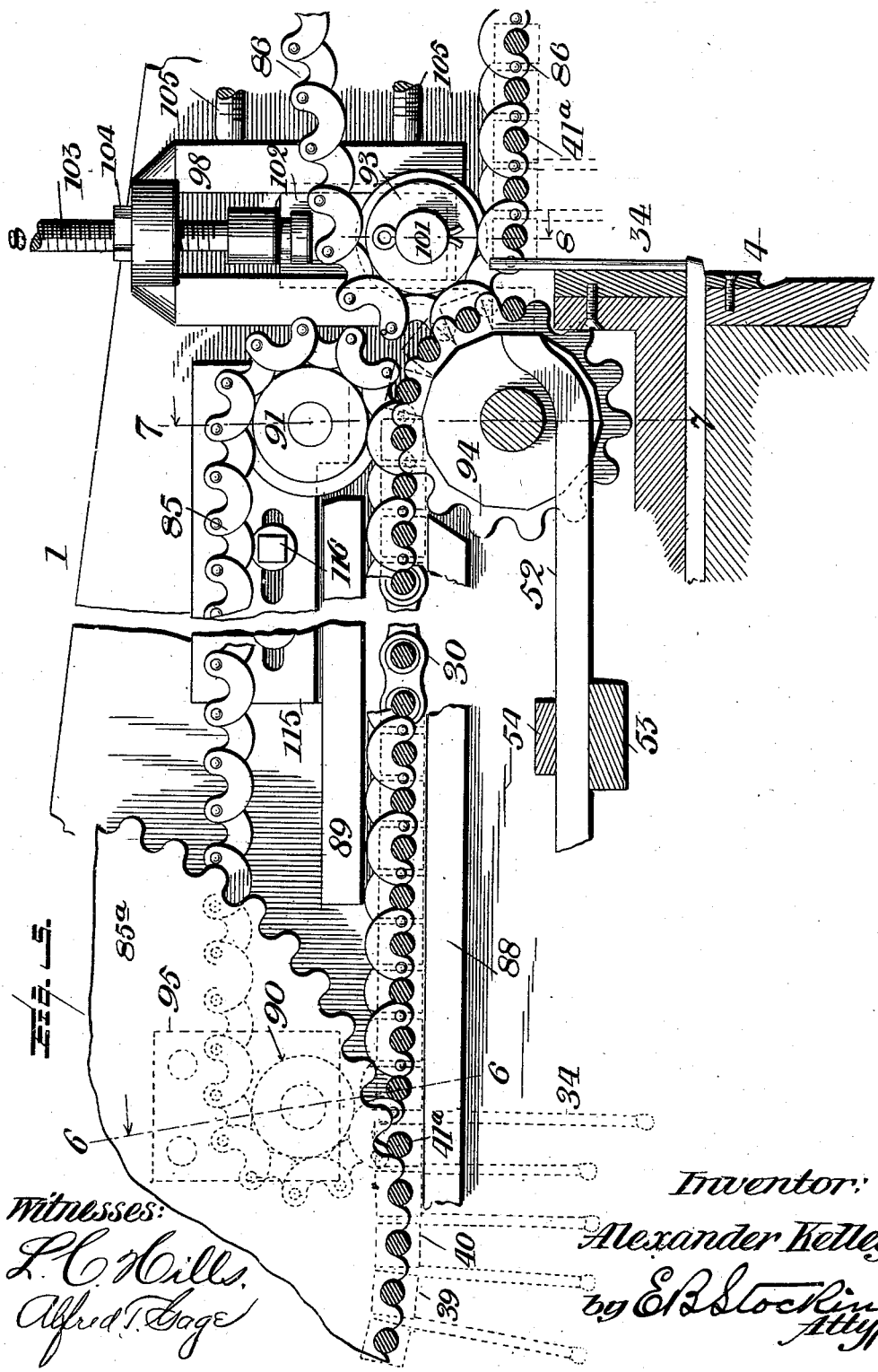

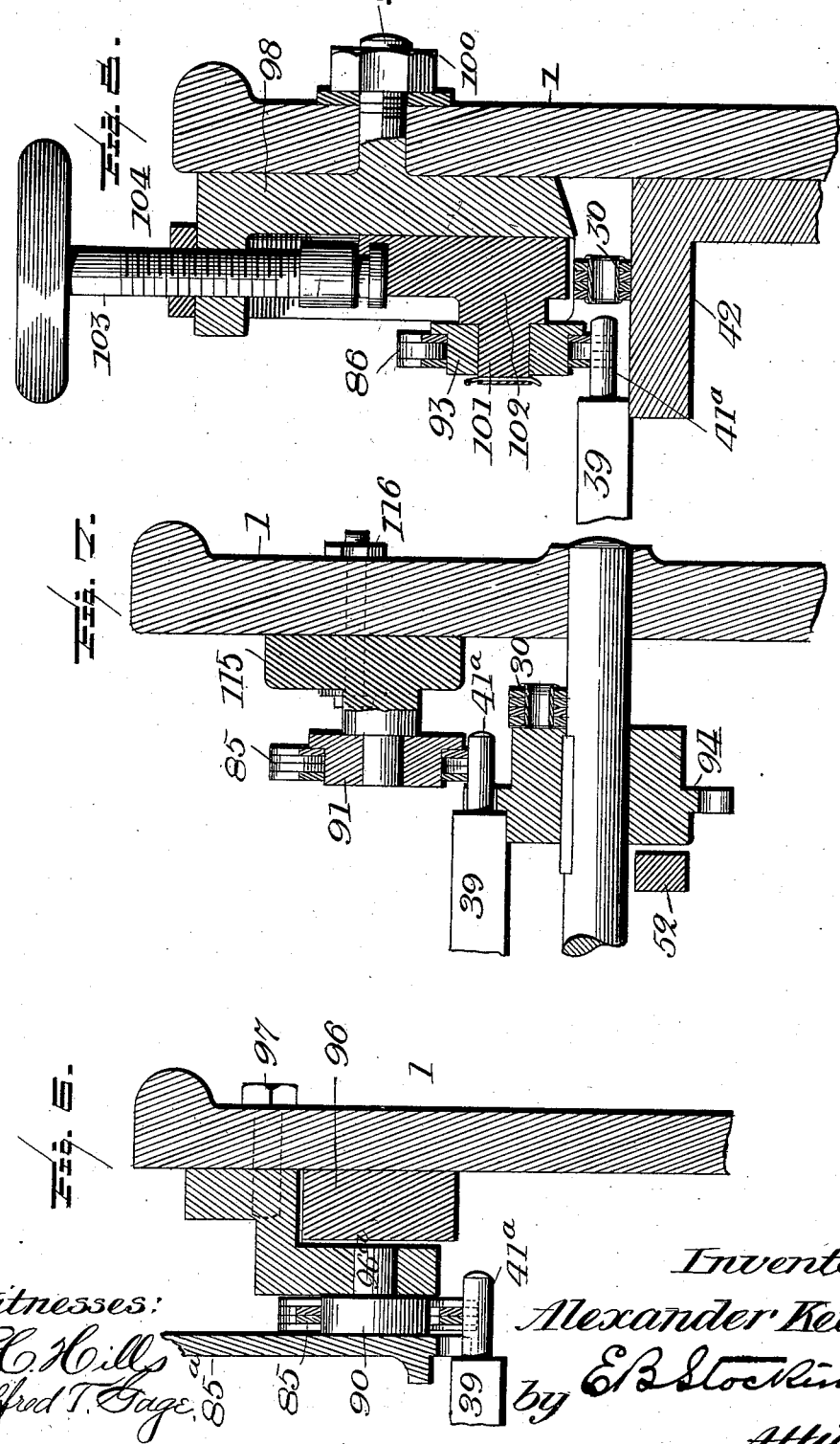

No. 654,794. Patented July 31, 1900.
A. KELLEY.
MATCH MAKING MACHINE.
(Application filed Mar. 28, 1900.)
(No Model.) 8 Sheets—Sheet 7.
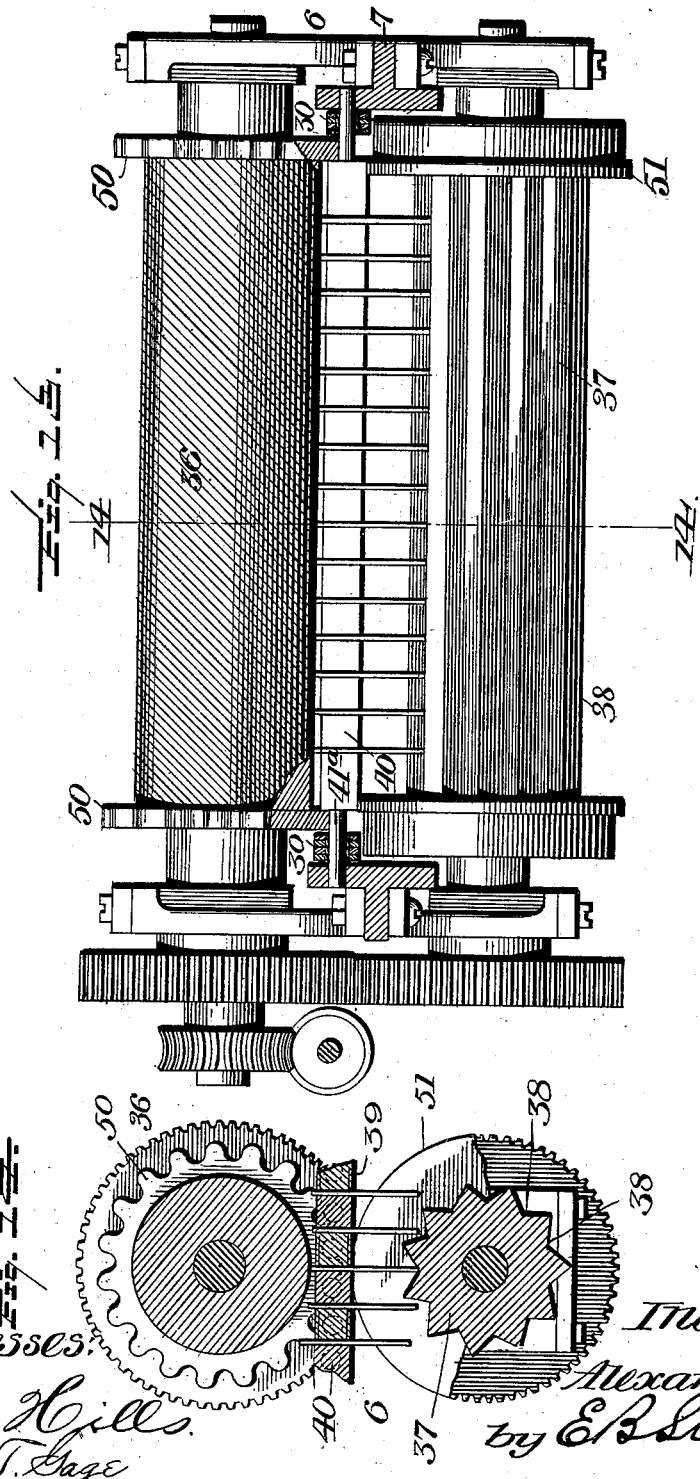

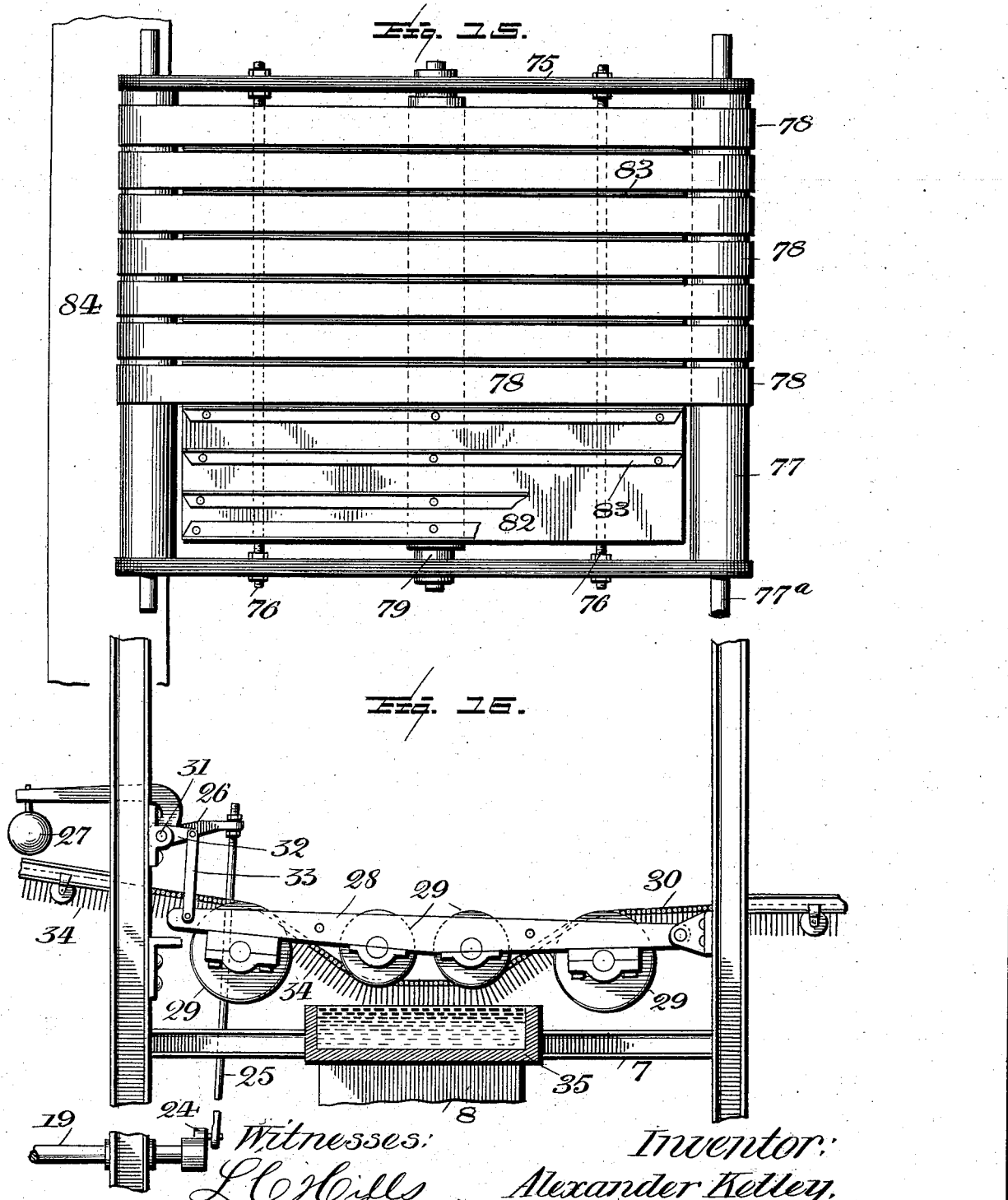

UNITED STATES PATENT OFFICE.

ALEXANDER KELLEY, OF CAMDEN, NEW JERSEY, ASSIGNOR TO THE RUBY MATCH COMPANY, OF WILMINGTON, DELAWARE.

MATCH-MAKING MACHINE.

SPECIFICATION forming part of Letters Patent No. 654,794, dated July 31, 1900.

Application filed March 28, 1900. Serial No. 10,513. (No model.)

*To all whom it may concern:*

Be it known that I, ALEXANDER KELLEY, a citizen of the United States, residing at Camden, in the county of Camden, State of New Jersey, have invented certain new and useful Improvements in Match-Making Machines, of which the following is a specification, reference being had therein to the accompanying drawings.

This invention has relation to match-machines, and comprises certain improvements upon my invention as disclosed in United States Patent No. 606,994, granted to me July 5, 1898. A reference to said patent will show that the principle of the machine involves the use of a carrier comprising a main chain and a series of independent bars and means for disengaging the main chain from said bars successively to form a space between successive bars of the carrier for the reception of a row of match splints or sticks to be made into completed matches, and also means for separating successive bars of the carrier for the purpose of ejecting completed matches from between the same.

Among the objects of the invention herein disclosed is to provide a knocker-operating cam which is adapted to cause the knocker to not only contact with but to follow a bar in the operation of clamping splints between adjacent bars.

Another object of the invention is to relieve the auxiliary chain from undue strain and to adapt it to be readily and accurately adjusted and to quickly seize upon and carry forward a bar when it reaches the field of operation of said chain. These advantages are secured, primarily, in a division of the auxiliary chain into sections, as hereinafter more particularly described.

Another object is to so improve the knocker that it shall neutralize the tendency of a bar of the carrier to spring at its center when forcibly clamping match-sticks against an adjacent bar.

Another object of the invention is to provide mechanism whereby when a machine is stopped and started the splints which at the time are at that point of the machine where the paraffin-tank is located such mechanism shall automatically in starting lower the splints into the paraffin and in stopping automatically lift the splints from the paraffin-tank, so that no splints may pass the paraffin-tank without being immersed, a circumstance which frequently occurs where the dipping and starting and stopping mechanisms are independent of each other.

A further object of the invention is to improve the evening mechanism so as to secure a uniform speed of travel of the carrier and the splints therein through the evening mechanism and to prevent undue strain upon the pintles of the carrier-bars during the action of the evener upon the splints therein.

A further object of the invention is to provide a delivery-table which shall receive the matches as they promiscuously fall thereon, direct them from said table with their heads to the front in the line of travel, and to deliver the same into a transversely-arranged receiver *en masse*, with their heads all in one direction, from which transverse receiver the matches in this condition are delivered or may be gathered for subsequent packing in boxes or curing-trays.

Other objects and advantages of the invention will hereinafter appear in the following description, and the novel features will be particularly pointed out in the appended claims.

In the drawings, Figure 1 is a side elevation, with portions broken away, of the principal elements of a machine constructed in accordance with my invention. Fig. 2 is a diagrammatic plan of the connected starting and stopping and elevating and depressing mechanisms for conjointly controlling the machine and the paraffin-dipping operation thereof. Fig. 3 is a substantially-central vertical section of the head of the machine. Fig. 4 is a plan of same. Fig. 5 is a vertical section, on an enlarged scale, of a portion of the head. Fig. 6 is a detail in vertical section on the line 6 6 of Fig. 5 of the means employed for supporting the rear end of the auxiliary chain. Fig. 7 is a vertical section on the line 7 7 of Fig. 5. Fig. 8 is a section on line 8 8 of Fig. 5. Fig. 9 is a diagrammatic perspective of mechanism for conjointly operating the cleaner and the knocker. Fig. 9ª is a detail of the knocker-operating cam. Fig. 10 is an elevation of an end portion of a bar, showing its pintle, guides contacting with the end of the bar at the top of the pintle, together with a section of the frame and of the main and auxiliary chains, the former chain being detached from the bars. Figs. 11 and 12 are respectively a side elevation and a cross-section illustrating a new form of bar employed and its operative relation with bars of other forms. Figs. 13 and 14 are respectively an elevation of the evener and a cross-section on the line 14 14 of Fig. 13. Fig. 15 is a plan, with portions broken away, of the improved delivery-table; and Fig. 16 is a side elevation, with parts in section, of the paraffin-dipping mechanism.

1 represents the frame of the head of the machine, which, generally speaking, is like that shown and more fully described in my patent hereinbefore referred to.

2 indicates the standards, in which the pulleys 3 serve as a means for conducting the endless carrier through the machine in desired directions.

4 is the cutter-head, which may be of usual construction to produce match-sticks from material introduced in the cutter-box 5, Fig. 4.

6 is the evener mechanism, secured to the angle-iron or framework 7 in any suitable manner and designed to be driven in the manner disclosed in my said patent.

8 is the paraffin-tank, and 9 the composition-tank, which is provided with the hot-water-circulating system 10, supplied with water from any suitable source by the pipe 11, and provided with a condensed-water-draw-off pipe 12, hereinafter more particularly described. The sliding frame 13, operated by the wheel and pinion 14 and rack 15, is for removing the carrier and the splints therein from the composition-applying mechanism.

Referring to the means for automatically raising and lowering the splints from and into the paraffin-tank at the time of stopping and starting the machine, Fig. 2 represents at 16 the main shaft, on which is a clutch member 17, adapted to be moved upon the shaft longitudinally by a rock-arm 18, mounted upon a rock-shaft 19, which may be arranged in bearings 20 upon the floor and at any other suitable point. At one end of this rock-shaft is a rock-arm 21, which is pivotally connected with a lever 22, pivoted in a bearing 23 upon the floor or at any suitable fixed point. At the opposite end of the rock-shaft 19 is another rock-arm 24, connected by a rod 25 to an arm 26, Fig. 16. This arm is mounted upon the shaft 31, which carries a counterbalancing-weight 27, adapted to balance the weight of the frame 28, carrying the guide-pulleys 29, upon which the main carrier 30 runs. The arm 26 is mounted upon a shaft 31, having rock-arms 32 thereon which are connected by straps 33 with the frame 28. A reference to the mechanism just described will show that when the lever 22, Fig. 1, is thrown away from the machine the clutch member is separated from its companion on the main shaft to stop the machine. This action of the lever 22 raises the rock-arm 24 of shaft 19 and through the connections described causes the frame 28 to be elevated, so as to withdraw the splints 34 in the carrier 30 above and away from the paraffin in the tank 35. It is also apparent that the opposite movement of the lever 22 will depress the splints into the paraffin a desired distance when the clutch member is thrown into connection with its companion to start the machine. By this construction and operation the machine cannot be started and operated for a time, so as to allow a number of splints to pass the paraffin-tank without being dipped therein, and thus produce imperfect matches.

The evener mechanism 6 (see Figs. 13 and 14) comprises an upper roll 36, the surface of which is preferably roughened in any suitable manner, and a lower roll 37, the surface of which comprises a series of longitudinal grooves 38 of such depth or pitch as to most perfectly aline a row of match-splints between two bars of the carrier 30.

A reference to Figs. 10, 11, and 12 is made for a clear understanding of the elements comprising the carrier 30. These are bars 39 and 40. The bars 39 are constructed with plain sides of any desired number, preferably four, making the bar rectangular in cross-section, (see Fig. 12,) while the bars 40 preferably have the same number of sides, but all of them provided with transverse grooves 41 for receiving a match-splint. These bars 39 and 40 are arranged alternately throughout the carrier. In my aforesaid patent all of the bars were grooved. Now by providing alternate smooth-faced bars I reduce the cost of manufacture to a great degree, while at the same time I secure the same clamping action between the bars. All of the bars have at each end a pintle $41^a$. The frame 1 has, wherever it is required to separate the main chain from the pintles, a guide 42 below the bars, having a groove 43, extending longitudinally in such a diagonal line as to conduct the main chain 30 toward or away from the pintle, as the chain is to be connected with or disconnected therefrom. The frame also has a guide 45, upon which the bars ride, contacting with the guide on a flat side of the bar. The frame also has an upper guide 46 and groove 47 for the reception and direction of the auxiliary chain 85, and also a guide 49, which bears against the end of the square body portion of the bar and may or may not bear against the upper surface of the pintle $41^a$. Now it should be noted that whenever the bars are separated one from another at the point in the machine where splints are inserted into and at the other point where the splints are delivered from the carrier these diagonal guiding-grooves 43 are provided so that such separation of the bars one from another may take place.

Having described the construction of the element denominated the "carrier," return is made to Figs. 13 and 14 and to the description of the evener mechanism. At both ends of the roll 36 are sprockets 50, which are adapted to mesh with the pintles 41ª of the bars 39 and 40. These sprockets assist the main chain 30 in feeding the bars regularly through the evener-roll. At each end of the lower grooved roll 37 is a collar 51, which contacts with the lower surface of each bar as it passes between the evener-rolls. The purpose and object of these collars is to provide a supporting-surface for the bar at the time that the upper evener-roll presses the projecting splints down into the common horizontal line to insure an even dipping of the same in the composition and uniform heads on the matches. This downward pressure is resisted by the collar 51, and thus undue strain upon the pintles 41ª is obviated. The steady and uniform rotation of the evener-rolls is accomplished by the pinions and worm-gear shown, which are fully described in my pending application, Serial No. 682,485, filed June 3, 1898.

*Knocker and cleaner mechanism.*—In Figs. 1 and 9 are shown the knocker and the cleaner mechanism for operating the same. 52 represents the knockers. They are arranged beneath the bed of the machine on a cross-bar 53, having guide loops or boxes 54 to maintain the knockers in a right line. In the present invention I employ three knockers to contact with a bar at three points along its body portion, one at each end and one at the center. It is apparent that the number may be increased, and I find that one central knocker is sufficient to overcome the tendency of a bar to spring away from its companion at the center. These knockers are simultaneously brought into contact with the bar by means of a rock-shaft 55, having arms 56 rigidly mounted thereon, one of which is extended to form an arm 57, adapted in any suitable manner to contact with a cam on the shaft 58 of Fig. 1. This shaft and cam are shown and described more particularly in my aforesaid patent. Each of the knockers 52 is connected with the rock-arms 56, the outside knockers directly therewith and the middle knocker directly with a yoke 59, which in turn is connected with the rock-arms 56. Adjusting means 60, comprising a turnbuckle connection, or adjusting-nuts 61 are provided, so that the exact length of the knocker may be determined and the exact timing of the contact of all the knockers controlled. The cam for operating the arm 57 is shown in Fig. 9ª. The cam 62 of shaft 58 has its operative projection 63 extended from the center at the rear portion thereof, so that after the front portion of the cam projections has contacted with the friction-roller 65 on arm 57 to cause the knockers to contact with the bar the cam progresses and forces the arm outwardly on the extended portion 64 of the cam to cause the knockers to follow the bar after they have contacted therewith. By these means greater control over the bar and accuracy in its clamping operation are secured. On the rock-shaft 55 there is a rock-arm 66, which is pivotally connected with a rock-arm 67 on rock-shaft 68, to which the arms 69 are rigidly secured. The cleaner 70 is mounted on arms 71, pivotally secured to the arms 69. To the free ends of the arms 71, which extend beyond their pivots, is secured a spring 80ª. A pin or stop 72 (see Fig. 3) is provided to limit the backward movement of the upward extension of the arm 71. The rock-arm 66 may be rigidly secured to the rock-shaft 55, if desired, whereby the cam 63, through the medium of arm 57, shall simultaneously operate the knockers and the cleaner; but in order to provide independent adjustment of the times of the operations of the knockers and the cleaner I provide an extension 73 of the arm 66, which extension contacts with the cam 74 on shaft 58. (See Fig. 1.) By this means independent timing of the cleaner is provided for. The operation of the cleaner is such that as the bars are separated for the delivery of completed matches the oscillation of the rock-shaft 68 causes the cleaner-bar 70 to descend into the space between the bars and force the matches therefrom. As the following bar is brought forward in a manner hereinafter described the cleaner 70 is carried with it, which is permissible by the elongation of the springs 80ª, which as soon as the cleaner is free from the following bar causes it (the cleaner) to assume its normal position ready for a completion of a successive operation. Beneath the upper portion of the head of the machine, the location being at the left of Fig. 1, I arrange in any suitable manner the delivery-table illustrated in Fig. 15. The extreme end of this table is shown at the extreme end of Fig. 4 in position. This table consists of a framework 75, suitably tied by rods 76 and having in each end thereof rollers 77, one of which is extended, as at 77ª, for the purpose of giving motion thereto and to the belts. Upon the rollers is a series of narrow endless bands 78. A central band-tightening roller 79 is arranged beneath the frame. (See Fig. 3.) A brace 80 serves to maintain the frame 75 in a horizontal position, said brace having a joint 81 which facilitates the removal of the delivery-table from the machine. Within the frame 75 is a bed 82, supported on the rods 76, and upon this bed is a series of vertical partitions 83. These partitions project upward between adjacent belts and are less than a match length apart, so that all matches falling promiscuously from the carrier are caused to take a position longitudinally upon one or the other of the belts, and the latter, moving in unison or not, as preferred, in the direction from the machine, deliver the matches on it to a transverse feed-belt 84 in a trough having a width slightly in excess of the length of a match-stick, said feed-belt traveling in a direction at a right angle to that of the travel of the belts 78, and consequently convey the matches thereon *en masse* into a suitable receptacle, if desired, or the matches may be gathered by an operator by hand from the transverse belt. As the matches fall from the bars the heads being heavier in comparison with the splint cause them to retain their positions head downward, and the heads, striking the moving belt 78, are started therewith before the splint above the head is affected, and this causes the matches to fall upon the belt with the splint ends pointing to the rear in the line of movement of the belt. Such matches as do not fall thus parallel, but diverge laterally, contact with the upper edge or a side of a partition and gradually assume a parallel position on the belt. This operation takes place in a very large majority of the fallen matches, while a very limited number may by chance not rest upon the belt with their heads to the front.

*Divided auxiliary chain.*—In my aforesaid patent I employed an auxiliary chain which was continuous from a point in rear to a point in front of the curved path at the splint-receiving point of the machine, the chain being depressed in the curved path by a roller placed in front of the sprockets constituting the curved path. In this construction I find a somewhat-severe tension or strain put upon the auxiliary chain. To avoid this, I have devised an auxiliary chain constructed in sections. The rear section 85 extends from the curved path rearwardly to a point where the matches are discharged from the machine, as clearly shown in Figs. 1, 3, and 5. The forward section 86 extends from the curved path to a point where the main chain has been brought into operative connection with the pintles of the bar. The main chain 30, Fig. 3, is separated from the pintles of the bars in the guide 87, Fig. 3, at a time when the pintles are in the teeth and under the control of the idle sprocket 85ª. By releasing the main chain from the pintles at this point rather than at a curved part of the sprocket considerable friction and strain upon the chain and pintles are avoided. The guide 87 has a groove located beyond the ends of the pintles similar to the guide 42 with its groove 43, as hereinbefore described. (See Fig. 10.) The main chain having been released from the pintles of the bars 39 and 40 said bars are carried down the curved path to the straight guides 88 below the bars and the straight guides 89 above the bars. (See Fig. 3.) In the meantime, however, the rear section 85 of the auxiliary chain passes over a comparatively-small pulley 90, Figs. 5 and 6, so located that just as soon as a pintle 41ª begins to leave the teeth of the sprocket 85ª, while the bar is on the lower straight guide, the open link of the rear section of the auxiliary chain 85 comes down under the pulley 90 and grasps the pintle. This occurs at each end of the bar, there being an auxiliary-chain section at each side of the machine and the auxiliary chain carries the bars forward to the curved path, where the rear auxiliary section 85 passes upward around a pulley 91 and thence back to the pulley 90. Now by reason of the comparatively-small diameter of the pulley 90 there is a quick angular movement of the auxiliary chain at this point which draws the bar caught by the links suddenly away from the following bar, thus forming a space for the action of the cleaner, as shown in Fig. 3. After the rear section of the auxiliary chain passes upwardly away from the pintles of the bars they are controlled in their movement down the curved path by the fixed curved extension 92 (see Figs. 3 and 4) of the upper guide 89. These extensions contact with the flat faces of the bars (see Fig. 4) and terminate a distance above the lower straight guide 88, which extends through the head of the machine beyond the curved path sufficiently for the passage under the end of the curved guide of the bar of the carrier. The front section of the auxiliary chain passes around a relatively-small pulley 93, arranged at the curved path. By reference to Fig. 5 the action of this section of the auxiliary chain will be seen to be similar to the rear end of the rear section of said chain—that is to say, as soon as the knockers 52 have forced a bar from the sprockets 94 in the curved path in the act of clamping a row of splints the open link of the section 86 is brought into engagement with the pintles of the bars. These being present at each end of the bar the front sections of the auxiliary chains conduct the bars in clamping relation with each other forward until the main chain is brought into engagement with said pintles, whereby the bars loaded with matches are carried throughout the machines and finally brought again to the head, where the completed matches are discharged in a manner hereinbefore described. A non-adjustable permanent location and mounting of the pulleys which support the receiving ends of the sections of the auxiliary chains may be employed; but for greater accuracy in timing the seizing function of the auxiliary-chain links I prefer to adjustably mount the pulleys over which the chains pass at the time this function is performed. In Fig. 6 I show the means for adjusting the pulleys 90, which comprise a hanger 95, which consists of an L-shaped bracket resting upon a rib 96, formed on or secured to the frame 1. A bolt or bolts 97, mounted in slots in the frame, permit of a longitudinal movement of the bracket and its securance in an adjusted position. The bracket 95 carries a stud 96ª, on which the pulley 90 is mounted and about which the rear section 85 of the auxiliary chain passes. The forward pulley 91 (see Figs. 5 and 7) of the rear section 85 of the auxiliary chain is mounted in a bracket 115, adjustably secured to the frame 1 by a slot-and-bolt connection 116. The front pulley 117, Fig. 3, of the front section 86 of the auxiliary chain is mounted in a sliding box adjusted by the bolt and nuts 118, as clearly shown in Fig. 3.

The several parts of the machine, including both auxiliary chains, may be driven by any suitable mechanism—for instance, a main driving-shaft 120, (see Figs. 4 and 8,) geared to a shaft 121, carrying a master-gear 122. This master-gear at one side meshes with a driving-gear 123, which carries a suitable sprocket 124 for feeding one end of the rear section of the auxiliary chain. The sprocket for carrying the bars in a curved path may be driven by a gear 125 upon the end of its shaft, which meshes with a gear 122, while the front section of the auxiliary chain may be driven by means of a gear 126 upon the shaft of the front pulley 117 by means of an interposed idler-gear 127 between the gears 126 and 125.

The adjustment of the roller 93, over which the front section 86 of the auxiliary chain runs, is secured by the following instrumentalities: A bracket 98 is mounted in the frame 1 by means of a pivot 99, Fig. 8, passing through the frame and secured by a nut 100. This bracket is therefore capable of oscillation on the pivot to move the pulley 93 toward and away from the curved path. The pulley 93 is mounted on a stud 101, formed on a cross-head 102, riding in gibs or ways formed in the bracket 98. An adjusting-bolt or threaded shaft 103 is threaded in the bracket 98 and has a set-nut 104 to fasten it in an adjusted position. The lower end of the shaft 103 is rotatably connected with the cross-head 102, whereby elevation and depression of the pulley 93 is produced. A bracket 104$^a$, Fig. 3, provided with set-screws 105, is secured to the frame 1, so that after the bracket is once adjusted it may be maintained in position by said screws 105. By these adjusting means exactitude and accuracy are secured in timing the grasping of a pintle by the open links of the forward section of the auxiliary chain.

I have provided a novel means for controlling the temperature of the composition-tank. It is well known that the igniting compound of match-heads is applied in a heated or melted condition and that when cold it becomes hard. It is therefore necessary to maintain the temperature of the tank at about 120° Fahrenheit. If the temperature varies to any material extent below this point, it is impracticable to apply to the splints match-heads of uniform size and shape. For these and other reasons it is desirable to maintain the temperature very nearly constant. Again, after a day's work is accomplished the composition, if neglected, solidifies, so that time is wasted upon the commencement of another day's operation of the machine in the work of heating the composition to the proper temperature and consistency. The importance of maintaining the temperature of the composition is therefore further apparent. The composition-tank proper, 9, is surrounded by a water-jacket 106, supplied by pipe 10 entering the jacket at one point and pipe 107 proceeding from the jacket at a different point. A suitable valve 108 in pipe 118, which extends to any suitable water-supply, controls the supply of water to the jacket 106. These pipes communicate with the outer casing 109 of an ordinary steam-trap, which comprises a pipe 110, extending to any suitable supply of steam, which pipe passes through the casing 109 and is closed by a valve carried by a cross-head 111. This cross-head is carried by two rods 112, which by their expansion and contraction, in accordance with the temperature of the steam within the trap, open or close said valve, and thereby permit the escape of steam through expansion of the rods at a predetermined temperature and prevent the escape of steam by contraction of the rods caused by a lowering of the temperature. Now I have provided a means whereby when it is desired to release the water of condensation within the casing 109 or within the pipes 10, 107, 108, or 110 the same can be accomplished without changing or in any wise interfering with the fine adjustment of the valve 111$^a$, the stem of which is carried by the cross-head 111. This is necessary when starting up each morning for work unless some means is provided for avoiding the same. My manner of accomplishing this work involves the provision of the pipe 12, having a draw-off valve 114, said pipe extending to any suitable drain or outlet. By this apparatus the heating system of the composition-tank is provided with steam continuously day and night, and with the provision of the adjustable steam-trap shown and described a practically-uniform temperature of the composition is maintained; but during the night the heating system becomes loaded to a greater or less extent with the water of condensation, and this is quickly and wholly removed by the employment of the draw-off pipe and valve which I have provided.

Throughout this specification I have used the term "curved path" to designate the point at which splints are inserted by the cutter-head between the bars 39 and 40.

It is obvious that changes may be made in the various details of construction and configuration of the several parts without departing from the spirit of this invention, as defined by the appended claims.

Having described my invention, what I claim is—

1. In a match-machine, a carrier comprising a series of independent separable bars between adjacent ones of which splints are to be held; means for moving the bars in a curved path, and an auxiliary chain divided into sections each terminating at the curved path; substantially as specified.

2. In a match-machine having a curved path at the splint-receiving point, a carrier comprising independent bars, means for moving the same in the curved path, and an auxiliary chain terminating at the curved path and adapted to engage said bars as they leave the curved path; substantially as specified.

3. In a machine of the class described having a carrier and a curved path for the same at the splint-receiving point, an auxiliary chain adjustably mounted at one end at the curved path of the carrier; substantially as specified.

4. In a machine of the class described having a carrier and a curved path for the same at the splint-receiving point, an endless auxiliary chain mounted upon a relatively-small pulley adjustably mounted at the curved path of the machine; substantially as specified.

5. In a machine of the class described, an auxiliary chain mounted upon a relatively-small pulley at and adjacent to a bar-carrying sprocket of larger diameter than said pulley whereby a relatively-quicker angular action upon the part of the chain is secured; substantially as specified.

6. In a machine of the class described, a cleaner pivotally mounted upon rock-arms, a stop for limiting pivotal movement in one direction and a spring connection between the cleaner and the rock-arm, and means for vibrating the rock-arm; substantially as specified.

7. In a machine of the class described, a series of independent splint-clamping bars, a main chain for carrying the same, means for separating the main chain from the bars, sprockets for receiving the bars when separated from the main chain and moving them in the curved path, an auxiliary chain, a fixed curved guide for maintaining the bars in the teeth of the sprocket after leaving said auxiliary chain, and a separate auxiliary chain passing over a pulley of smaller diameter than the sprocket and arranged to seize the bars in clamping relation and separate them from a following bar in the teeth of the sprockets; substantially as specified.

8. In a machine of the class described, the combination with a cleaner, of a series of independent splint-clamping bars, a main chain for carrying the same, means for separating the main chain from the bars, sprockets for receiving the bars when separated from the main chain, an auxiliary chain, fixed curved guides for maintaining the bars in the teeth of the sprocket, said auxiliary chain passing over a pulley of smaller diameter than the sprocket and arranged to form a space between bars as they leave the teeth of the sprocket; substantially as specified.

9. In a machine of the class described, the combination with a cleaner adapted to yield only in the direction of the movement of the bars, of a series of independent splint-clamping bars, a main chain for carrying the same, means for separating the main chain from the bars, sprockets for receiving the bars when separated from the main chain, an auxiliary chain, a fixed curved guide for maintaining the bars in the teeth of the sprocket, and an auxiliary chain passing over a pulley of smaller diameter than the sprocket and arranged to form a space to separate the bars as they leave the teeth of the sprocket; substantially as specified.

10. In a machine of the class described, the combination with a cleaner adapted to yield only in the direction of the movement of the bars and to automatically return to its normal position, of a series of independent splint-clamping bars, a main chain for carrying the same, means for separating the main chain from the bars, sprockets for receiving the bars when separated from the main chain, an auxiliary chain, a fixed curved guide for maintaining the bars in the teeth of the sprocket, said auxiliary chain passing over a pulley of smaller diameter than the sprocket and arranged to form a space to separate the bars as they leave the teeth of the sprocket; substantially as specified.

11. In a machine of the class described, a series of independent splint-clamping bars, means for moving said bars in a curved path, and an auxiliary chain divided at said curved path; substantially as specified.

12. In a machine of the class described, a series of independent splint-clamping bars, means for moving them in a curved path including one section of an auxiliary chain, knockers adapted to advance the last bar in the curved path, and an independent section of an auxiliary chain adapted to seize the said bar during the operation of the knockers; substantially as specified.

13. In a machine of the class described, a knocker and means for bringing the same into contact with and to follow a splint-clamping bar after it is in clamping relation with an adjacent bar; substantially as specified.

14. In a machine of the class described, a series of independent bars arranged in a curved path, an auxiliary chain terminating at the curved path and mounted for adjustment rearwardly and downwardly at the curved path; substantially as specified.

15. In a machine of the class described, a series of independent splint-clamping bars, and an auxiliary chain divided into two sections, the one section acting to form a space in the bars and the other section acting to secure the bars in clamping relation; substantially as specified.

16. The combination with a carrier-chain, of a match-machine, of a roller for said chain mounted on a vertically-adjustable cross-head and a pivotally-adjustable bracket for supporting the cross-head; substantially as specified.

17. In a machine of the class described, the combination with a series of independent clamping-bars of means for moving the bars in a curved path, means for transferring the bars from a curved path to a straight path, and an auxiliary chain terminating at the curved path and moving angularly faster than the means for moving the bars in said curved path; substantially as specified.

18. In a machine of the class described, the combination with the frame thereof, of a carrier-chain, a cross-head carrying a pulley upon which the chain is mounted, means for adjusting the cross-head in a substantially-vertical direction, comprising a threaded rod, a bracket pivoted to the frame carrying the cross-head and threaded rod and means for adjusting the bracket in a substantially-horizontal position; substantially as specified.

19. In a machine of the class described, carrier starting and stopping mechanisms and paraffin-dipping mechanism connected to be conjointly controlled; substantially as specified.

20. In a machine of the class described, carrier starting and stopping mechanisms and paraffin-dipping mechanism and connections whereby the actuation of the starting mechanism puts into operation the dipping mechanism and the actuation of the stopping mechanism throws the dipping mechanism out of operation; substantially as specified.

21. In a machine of the class described, dipping mechanism pivotally supported at one end to a fixed part of said machine and connected at the other end with counterbalancing lifting mechanism, and a rod connecting the latter with the carrier starting and stopping mechanisms of the machine; substantially as specified.

22. In an evener mechanism for match-machines, sprockets mounted on a roll of the evener mechanism and meshing with the splint-clamping devices, whereby an even feed of said devices through the evener mechanism is secured; substantially as specified.

23. An evener mechanism comprising an upper and a lower roll, means for passing a splint-carrier between said rollers, and means upon one of said rollers for moving the carrier; substantially as specified.

24. In an evener mechanism, an upper and a lower roll, means for passing a splint-carrier between said rolls and means upon the lower roll for supporting the ends of the carrier; substantially as specified.

25. In a machine of the class described, evener mechanism comprising a roll having means for supporting the carrier; substantially as specified.

26. In an evener mechanism, splint-clamping devices, means for moving the same, an upper and a lower roll, the former provided with means for coöperating with and moving the carrier and the lower roll provided with means for supporting the carrier; substantially as specified.

27. In a match-machine, a delivery-table comprising a series of narrow belts separated by partitions; substantially as specified.

28. In a match-machine, a delivery-table comprising a series of belts in width less than the length of the match, a series of partitions separating the belts from each other, and means for dropping the matches heads downward upon the belts whereby the matches are delivered with their heads to the front in the line of the movement of the belts; substantially as specified.

29. In a match-machine, a delivery-table comprising narrow belts, belt-dividing partitions, and a transverse belt wider than the length of the matches; substantially as specified.

30. In a match-machine, a splint-clamping carrier comprising bars having transverse match-receiving grooves upon all the sides thereof in combination with similar grooveless bars; substantially as specified.

31. In a match-machine, a carrier comprising independent separable bars between adjacent ones of which splints are to be held, means for moving said bars in a curved path at the splint-receiving point of the machine, a device arranged at and in rear of the termination of said curved path, and means for causing said device to contact with a bar of the carrier at about its mid-length and to move the same into the control of bar-moving means in advance of said curved path; substantially as specified.

32. In a match-machine, a carrier comprising independent separable bars between adjacent ones of which splints are to be held, means for moving said bars in a curved path at the splint-receiving point of the machine, a device arranged at and in rear of the termination of said curved path, and means for causing said device to contact with a bar of the carrier at about its mid-length and near its ends and to move the same into the control of bar-moving means in advance of said curved path; substantially as specified.

In testimony whereof I affix my signature in presence of two witnesses.

ALEXANDER KELLEY.

Witnesses:
WALTER B. HUMPHREYS,
M. A. WARK.